April 14, 1953  H. E. STEINHOFF  2,634,851
CONVEYER SYSTEM
Filed July 22, 1948
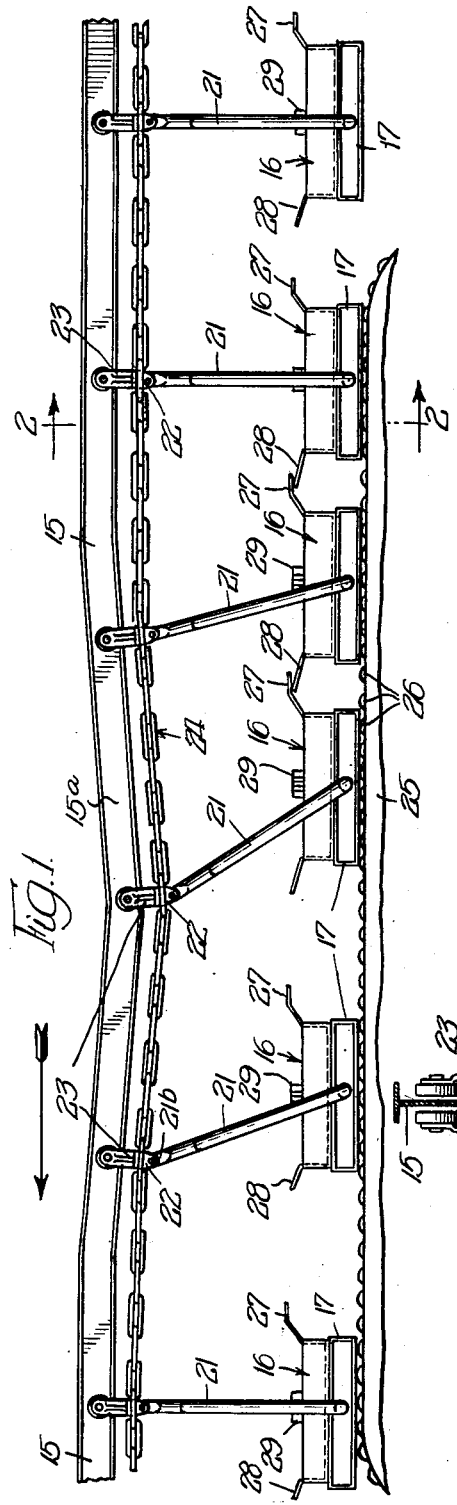
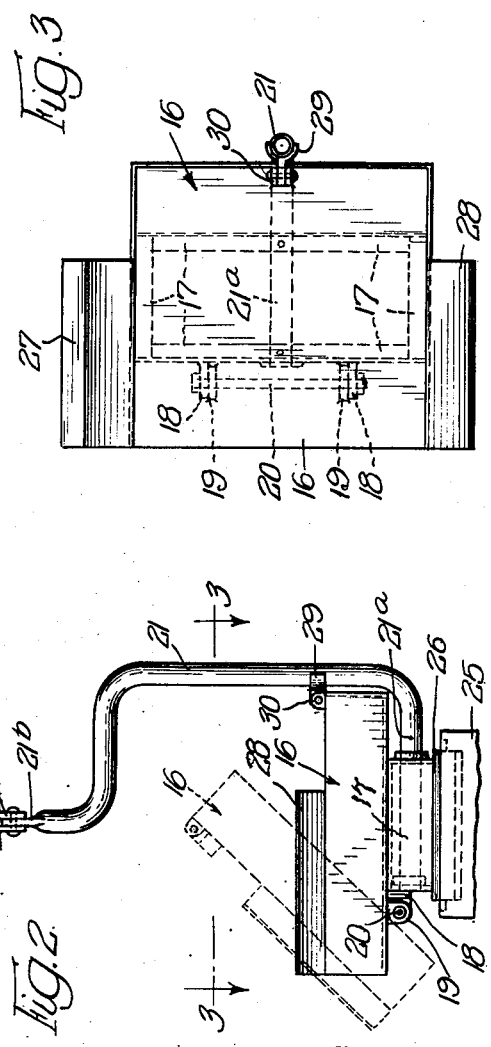
INVENTOR.
Harvey E. Steinhoff,
BY George Heidman
Atty.

Patented Apr. 14, 1953

2,634,851

UNITED STATES PATENT OFFICE 2,634,851

CONVEYER SYSTEM

Harvey E. Steinhoff, Decatur, Ill., assignor to Wagner Malleable Iron Company, Decatur, Ill., a corporation of Illinois Application July 22, 1948, Serial No. 40,139

6 Claims. (Cl. 198—19)

My invention more specifically stated relates to a continuous or endless conveyor system involving an overhead continuously moving or traveling pull chain, cable or other suitable more or less yieldable element adapted to travel through a circuitous path and to control a plurality of suitable receptacles, pans, trays or buckets suitably suspended from an overhead rail or track.

The invention contemplates novel means, whereby the material holding receptacles or buckets are pendently suspended from the overhead rail or track in uniform spaced relation except at preselected locations such as loading platforms or zones where a table, platform or roller conveyor is provided upon which the material holding receptacles, trays or buckets are placed or rested and where declinations or dips in the overhead rail or track are provided to reduce the vertical distance between the overhead rail or track and the bottom of the material holding receptacles, trays or buckets, and/or platform, roller conveyor, or table and cause the pendant to incline and induce the material holding receptacles, trays or buckets to lag and occupy the loading zone for a momentary period of time at a slightly lesser speed without interfering with the continuous uniform and predetermined speed of the pull cable or chain, thereby causing the receptacles, trays or buckets to group closely together at predetermined intervals while passing through the loading zone. As the material holding receptacles, trays or buckets leave the loading zone, the overhead rail or track is inclined until the pendants assume a normal position and uniform spacing.

My invention contemplates rigid suspending elements or bails pivotally connected at their upper ends to trolley members while their lower ends have swiveled connection with the receptacles, trays or buckets.

The afore-mentioned objects and advantages of my invention will be readily comprehended from the detailed description of the accompanying drawing wherein—

Figure 1 is a side elevation of a portion of the conveyor system involving a loading zone.

Figure 2 is a vertical sectional view taken on the line 2—2 of Figure 1 looking in the direction of the arrows and indicating a dumping position of the bucket or receptacle in dotted lines.

Figure 3 is a plan view taken substantially on the line 3—3 of Figure 2 looking downwardly.

My improved system contemplates pendently suspending a multiple of trays or material holding members from an overhead track or non-yielding supporting element by rigid or non-flexing links pivotally connected with a continuously traveling and endless chain or element; the trays or material holding members being arranged in uniform predetermined spaced relation, at prearranged elevations and adapted to travel in a predetermined plane.

In the specific exemplification of my invention, the overhead supporting element is shown in the form of a rail 15, preferably of I-beam cross section, arranged in a continuous or at predetermined planes throughout the system except at preselected points designated as loading zones where the rail 15 is declined as at 15$^a$ for a predetermined length and degree of declination and then inclines back to its normal plane as shown at the left in Figure 1.

The material holding members, trays or containers are shown at 16 and may be of any suitable form, preferably of rectangular shape with side and end walls and flat bottom which seats on an underframe 17, Figures 1 and 2, and as shown in dotted lines in Figure 3 preferably extending from end to end of the tray or container 16.

The frame is provided with spaced lobes or ears 18, see Figure 3, and the tray or container 16 also is provided with spaced lobes or ears 19; the lobes of the frame and the lobes of the tray or container being arranged in overlapping relation and having registering holes to receive the pivot bolt or pin 20, whereby the tray or container is secured to the underneath frame and permitted to tilt into discharging position as indicated in dotted lines in Figure 2.

Each tray or container holding frame has a suspending bail or element for rigidly supporting the frame and container from the overhead support or rail 15. These bails, as shown in the exemplification, each consist of a rigid bar or tube 21 bent into somewhat reverse C-shape with a straight bottom section 21$^a$ which extends transversely through the skeleton underframe 17 as shown in dotted lines in Figure 3 and in full lines Figure 2 and affords a swivel connection for the tray-frame which permits the bail to assume an inclined position relative to the underframe as shown in Figure 1. The bail extends upwardly about one end or side of the tray or container and rearwardly in a direction substantially parallel with the bottom section 21$^a$ and thence upwardly where it terminates in a reduced or retcangular vertically disposed portion as at 21$^b$. With the bail secured to the underframe as described and formed to extend about one end of the tray or container 16, as shown, free access to the tray or container for loading and unloading purposes is provided.

The upper portion 21ᵇ of the suspending element or bail 21 is pivotally secured to the depending shank or lug 22 of the roller-carrying clevis or U-shape member 23 which straddles the lower part of the rail or I-beam 15 and of which the sides or legs are provided with rollers which ride on the bottom flange and on opposite sides of the web of the rail as shown in Figure 2.

The shanks or lugs 22 of the roller carrying members are each of length sufficient to extend through a link of the endless pull member or chain 24, thus causing the rollers to travel uniformly with the chain throughout the conveyor system. The lower ends of the clevis legs 22 are each pivotally connected with the upper end of a bail or tray suspending member 21, allowing the rigid bails to swing out of vertical position into the inclined position in Figure 1 when the trays or containers are traveling through the loading zone.

At prearranged points in the system, namely coincident with the declination 15ᵃ in the track or rail 15, I provide a suitable table or platform 25 preferably with downwardly curving or sloping ends. The table or platform top preferably is provided with an anti-friction surface or a plurality of countersunk rollers as at 26 extending transversely of the table or platform. The roller carrying top of the table or platform is adapted to extend substantially into the horizontal plane of the tray-frame bottom.

As is apparent, when the containers rest on the table or platform, the vertical distance between the pivotal points at the upper ends of the bails and the bottoms of the container holding frames will be predeterminedly reduced or lessened where the supporting rail or track has the declinations or dips, thus permitting the composite frames and trays or containers to lag somewhat in their continuous travel, through the loading zones and enable the loading operations to be performed without interfering with the continuously moving chain or pull cable, which is held taut throughout the system, and which travels at a uniform speed.

In order to prevent spilling or material dropping between succeeding trays or carriers 16 while passing through the zones, particularly through the loading zones, I prefer to provide the ends of the trays or carriers with rigid aprons. These aprons may be formed as integral portions of the trays by extending the rear end wall into an upward outwardly sloping and thence rearwardly extending apron or shield 27, while the forward end wall extends forwardly at an inclination to form the apron or shield 28, formed to extend beneath the free upper end of the apron or shield 27 when the carriers pass through the loading zone where they come into closer relation as shown by the second, third and fourth trays from the right hand end and are entering and passing through the dip in the rail or track. The trays or carriers in Figure 1 are supposed to travel from right to left as indicated by the arrow.

My improved conveyor system contemplates maintaining a predetermined spaced relation between the trays or conveyors, the grouping being controlled by the size of the buckets or carriers pendently supported by rigid pendants or bails pivotally connected at their upper ends and with swiveled connection at the lower ends which permit a definite lagging relation between the buckets, trays or carriers while passing through certain zones.

In order to prevent the receptacles from tilting about their swiveled connections with the bottom of the bail, suitable means are provided, for example in the nature of a bifurcated member 29, which is adapted to straddle the upright portion of the bail 21; and this bifurcated member 29 is pivotally connected at 30 to the side of each receptacle, as shown in Figure 2. After the receptacle rests on the table or platform, the bifurcated member 29 is tripped or held out of contact with the receptacle bail so as to permit the bails and links to assume the positions shown in Figure 1 while traveling through the respective zones.

The exemplification of the invention shown and described is believed to be a simple embodiment of the invention but certain modifications of construction are possible and may be made without, however, departing from the spirit of the invention as defined in the appended claims.

What I claim is:

1. A conveyor system provided with zones and comprising the combination of an overhead rail provided at said zones with gradual dips of predetermined length; a plurality of trolley members ridably arranged on said rail and each provided with a depending shank; a taut endless pull element or chain connected to the depending shank of each trolley member whereby a predetermined spaced relation between the trolley members is maintained and the latter caused to travel said rail at uniform speed; material holding containers each provided with a rigid upstanding bail having swivel connection with the associated container while the upper end of the bail is pivotally secured to the shank of the associated trolley member beneath said pull element or chain to permit the lower end of the bail to swing rearwardly relative to the direction of the chain travel; and a table or fixed platform arranged beneath each rail-dip, in the normal horizontal plane of the container-bottom, adapted to support the container during its travel through said zones and thereby permit the bail to swing and the container to lag in its travel through said zones.

2. A conveyor system provided at preselected points with zones and comprising an overhead rail; a plurality of trolleys ridable along said rail and each having a depending shank; a taut endless pull element connected with the depending shank of each trolley whereby a predetermined spaced relation of the trolley members is maintained and the latter caused to travel at the speed of said endless element; material holding carriers, each provided with a rigid upstanding bail having swiveled connection with the bottom of the associated carrier while the upper end is pivotally connected with an associated trolley to permit the bail to swing in a direction lengthwise of the direction of travel; and platforms arranged at said zones in the path of travel of the carriers adapted to support the carriers during their travel through said zones, said rail and platform at each zone being constructed to provide a relative progressive vertical approach and recession therebetween, whereby temporarily to decrease the vertical relation between the bottoms of the carriers and said trolleys and thereby permit the bails to swing rearwardly and the carriers to lag in their travel through said zones without retarding the speed of travel of the pull element.

3. In a conveyor system provided at preselected points with zones, an overhead rail; a plurality of trolleys ridable on said rail; a taut endless pull element connected to the trolleys whereby the latter are maintained in a predetermined spaced relation and caused to travel along said rail; a plurality of carriers suspended from the trolleys, each carrier comprising an underframe, an open sided container hingedly secured adjacent the open side to the underframe so as to tilt toward one side of the system, the container ends having upwardly and outwardly sloping aprons at opposite ends, the apron at the one end of each container being adapted to overlap the apron at the opposite end of the succeeding container when the carriers pass through said zones; a bail swiveled in the underframe of each carrier and disposed upwardly about the side and above the top of the container and its upper end pivotally connected to its correlated trolley so as to swing in a direction longitudinally of the pull element; and platforms arranged at said zones in the path of travel of the carriers to permit the latter to rest thereon, said rail and platform at each zone constructed to provide a relative progressive vertical approach and recession therebetween, whereby temporarily to allow the bails to swing rearwardly and allow the carriers to lag in their travel through said zones.

4. In a conveyor system provided with a zone, an overhead horizontally disposed rail provided, at said zone, with a dip of predetermined degree; a plurality of trolley members ridable on said rail; an endless taut pull element or chain having controlling connection with each trolley member to maintain said members in predetermined spaced relation; a plurality of similar material carrying trays or receptacles provided with underframes; rigid links or bails pivotally connected at their upper ends respectively to said trolley members while the lower ends have supporting swiveled connections respectively with the tray or receptacle underframes, the lengths of said bails being correlated to the degree of dip in said rail; and a table or platform beneath said rail-dip, in the normal horizontal plane of the tray or receptacle underframe, adapted to support the trays or receptacles during their travel through said zone and thereby permit the bail to swing and said trays or receptacles to lag in their travel through said zone.

5. In a conveyor system provided with spaced zones, an overhead horizontal rail provided with dips of predetermined angularity respectively at said zones; a plurality of trolley members ridable on said rail; means for translating said members in predetermined spaced relation successively along said rail; a plurality of similar material carrying trays or receptacles each open at one side and provided with underframes to which the trays or receptacles are pivotally connected adjacent said open sides thereof; rigid bails having a pivotal connection at their upper ends respectively with said trolley members while their lower ends have swiveled connection with the receptacle or tray underframes to permit the bails to swing in a direction lengthwise of their travel, said bails maintaining similar spaced relation between the receptacles or trays while traveling through said zones; and tables or platforms arranged respectively beneath said rail-dips in the normal horizontal plane of the receptacle underframes adapted to support the receptacles during their travel through said zones.

6. A conveyor system provided with zones and comprising, in combination, an overhead track provided at said zones with dips; a series of trolleys mounted on said track, drive means for moving said trolleys in succession and in predetermined spaced relation along said track, a plurality of carriers, individual means for normally supporting said carriers at a predetermined vertical distance in vertical suspension respectively from said trolleys for movement therewith, said individual means being capable of providing vertical slack between each trolley and the carrier associated therewith, and means for supporting said carriers independently of said individual means and at a reduced vertical distance from their respective trolleys upon movement of said trolleys along said dips, whereby, as said carriers pass along said track, said suspension means are caused first to trail out the resulting slack so as to permit said carriers in progressive series to lag out of normal spaced relation into closely grouped relation, and then to take up said slack so as to separate said grouped carriers and return them to normal spaced relation.

HARVEY E. STEINHOFF.

References Cited in the file of this patent

UNITED STATES PATENTS

| Number | Name | Date |
|---|---|---|
| 801,523 | Hinchman | Oct. 10, 1905 |
| 1,507,888 | McBride | Sept. 9, 1924 |
| 2,007,044 | Francis | July 2, 1935 |
| 2,092,396 | Jennings | Sept. 7, 1937 |
| 2,555,227 | Emerson | May 29, 1951 |

FOREIGN PATENTS

| Number | Country | Date |
|---|---|---|
| 457,682 | Great Britain | Dec. 3, 1936 |
| 689,952 | France | Sept. 15, 1930 |